United States Patent [19]

Wehner et al.

[11] Patent Number: 4,642,322
[45] Date of Patent: Feb. 10, 1987

[54] STABILIZATION OF CHLORINE-CONTAINING THERMOPLASTICS WITH NITROGEN-CONTAINING ORGANIC COMPOUNDS

[75] Inventors: Wolfgang Wehner, Zwingenberg, Fed. Rep. of Germany; Horst Müller, deceased, late of Fürth/Odw, Fed. Rep. of Germany, by Anneliese Müller, Silvia Müller, Werner J. Müller, heirs; Rainer Schneider, Zwingenberg, Fed. Rep. of Germany

[73] Assignee: Ciba-Geigy Corporation, Ardsley, N.Y.

[21] Appl. No.: 815,771

[22] Filed: Jan. 2, 1986

Related U.S. Application Data

[63] Continuation of Ser. No. 746,927, Jun. 20, 1985, abandoned, which is a continuation of Ser. No. 592,677, Mar. 23, 1984, abandoned.

[30] Foreign Application Priority Data

Mar. 30, 1983 [CH] Switzerland ............... 1760/83

[51] Int. Cl.$^4$ ................. C08K 5/20; C08K 5/25
[52] U.S. Cl. ....................... 524/191; 524/217
[58] Field of Search ............. 524/217, 191; 523/125; 525/376, 374; 564/148, 163

[56] References Cited

U.S. PATENT DOCUMENTS

| | | | |
|---|---|---|---|
| 3,351,659 | 11/1967 | Santelli et al. | 564/163 |
| 3,644,278 | 2/1972 | Klemchuk | 524/217 |
| 3,929,726 | 12/1975 | Schollenberger et al. | 524/191 |
| 4,385,147 | 5/1983 | Wirth et al. | 524/217 |

FOREIGN PATENT DOCUMENTS

| | | |
|---|---|---|
| 871834 | 6/1952 | Fed. Rep. of Germany . |
| 1091120 | 10/1960 | Fed. Rep. of Germany . |
| 1543332 | 8/1969 | Fed. Rep. of Germany . |
| 652 | 5/1952 | German Democratic Rep. . |
| 28349 | 4/1964 | German Democratic Rep. . |
| 36360 | 6/1965 | German Democratic Rep. . |
| 1022958 | 3/1966 | United Kingdom . |

OTHER PUBLICATIONS

W. Jasching "Degradation and Stabilization of Polyvinyl Chloride" German Plastics Translations from Kunststoffe, vol. 52 (Aug. 1962) pp. 458/463.
G. M. Coppola–Synthesis (1980)–pp. 505 & 516-523.
K. Thinius–Verlag Chemie (1969) pp. 354-373.
Verity Smith–British Plastics (Aug. 1954) pp. 307-311.

Primary Examiner—Veronica P. Hoke
Attorney, Agent, or Firm—Luther A. R. Hall

[57] ABSTRACT

Chlorine-containing thermoplastics containing, as the stabilizer, at least one compound of the formula I

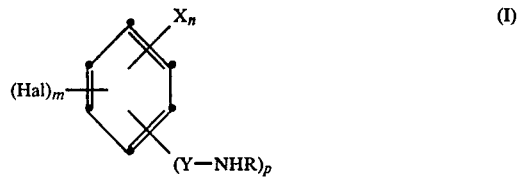

wherein m is the number 0, 1 or 2, n is the number 1, 2 or 3, P is the number 1 or 2, Hal is —F, —Cl, —Br or —I, X is —$NH_2$, —$NHCH_3$, —NH—$NH_2$, —$OCH_3$, —$OC_2H_5$, —$CH_3$ or —$C_2H_5$, Y is —CO— and R is as defined in claim 1, are described. A process for the preparation of (substituted) anthranilic acid amides is also described.

7 Claims, No Drawings

STABILIZATION OF CHLORINE-CONTAINING THERMOPLASTICS WITH NITROGEN-CONTAINING ORGANIC COMPOUNDS

This is a continuation of application Ser. No. 746,927, filed on June 20, 1985, now abandoned, which in turn is a continuation of application Ser. No. 592,677, filed on Mar. 23, 1984, now abandoned.

The present invention relates to chlorine-containing thermoplastics containing organic nitrogen-containing compounds, and to a process for the preparation of (substituted) anthranilic acid (2-hydroxyethyl)-amides.

Chlorine-containing thermoplastics must be protected from the harmful influence of light and heat. In particular, processing of the plastic to shaped articles is associated with exposure to heat, which causes a darkening and embrittlement if suitable additives are not added. Organo-tin compounds, metal carboxylates and phenolates, phosphites and mixtures thereof have hitherto been used, in particular, as additives for this purpose. In practice, the stabilisation achieved with these additives is not always sufficient, so that a need for improved, in particular metal-free heat stabilisers still exists.

Various nitrogen-containing organic compounds have been proposed for stabilising chlorine-containing polymers. Examples of these are phenylurea derivatives, such as those described, for example, in "Stabilisierung und Alterung von Plastwerkstoffen" (Stabilisation and Ageing of Plastics Materials) by Kurt Thinius, pages 358–359, (1969), and various aminophenols, such as are described in European patent application Ser. No. 0,048,222.

Aminobenzenesulfonic acid amides and aminobenzoic acid esters are furthermore described as PVC stabilisers in German Democractic Republic Pat. No. 652.

It has now been found that certain nitrogen-containing organic compounds are particularly suitable for stabilising chlorine-containing thermoplastics and are very effective against damage to these thermoplastics by exposure to heat during processing.

The invention relates to chlorine-containing thermoplastics containing at least one nitrogen-containing organic compound of the formula I

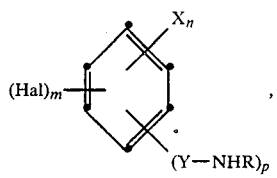

(I)

in which m is the number 0, 1 or 2, n is the number 1, 2 or 3, p is the number 1, or 2, Hal is —F, —Cl, —Br or —I, X is —NH$_2$, —NHCH$_3$, —NHNH$_2$, —OCH$_3$, —OC$_2$H$_5$, —CH$_3$ or —C$_2$H$_5$, and if several symbols X occur, these may differ within the given definition, Y is —CO— and R is —H, —OH, —NH$_2$, or C$_1$-C$_{18}$-alkyl, phenyl, benzyl or phenethyl, each of which is unsubstituted or substituted by one to three HO and/or C$_1$-C$_4$-alkoxy or phenoxy groups, or R furthermore is a group of the formula II

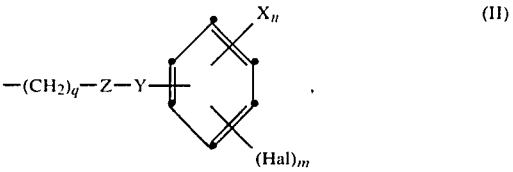

(II)

in which Z is —NH— or —O—, q is a number ranging from 0 to 6 and Hal, X, Y, m and n are as defined above.

An alkyl radical R is a straight-chain or branched group, for example methyl, ethyl, n-propyl, isopropyl, n-butyl, tert.-butyl, n-pentyl, tert.-pentyl, n-hexyl, n-octyl, 2-ethylhexyl, 1,1,3,3-tetramethylbutyl, or branched or straight-chain nonyl, decyl, undecyl, dodecyl, tridecyl, tetradecyl, pentadecyl, hexadecyl or octadecyl.

An alkyl, benzyl or phenethyl radical R which is substituted by —OH and/or alkoxy or phenoxy is, for example, 2-hydroxyethyl, 2-hydroxy-n-propyl, 3-hydroxy-n-propyl, 2,3-dihydroxy-n-propyl, 2-hydroxy-2-phenethyl, 2-methoxyethyl, 2-ethoxyethyl, 2-n-butoxyethyl, 2-isopropoxyethyl, 2-phenoxyethyl, 2-hydroxy-1-phenoxyethyl, 3-methoxypropyl, 2-hydroxy-3-n-butoxypropyl, 2-hydroxy-3-phenoxypropyl, 2-hydroxy-1,1-dihydroxymethylethyl, o-, m- or p-hydroxybenzyl, o-, m- or p-hydroxyphenylethyl, p-methoxybenzyl, p-methoxyphenylethyl, p-phenylbenzyl or p-phenoxyphenylethyl.

A phenyl radical R which is substituted by —OH and/or alkoxy or phenoxy is, for example, o-, m- or p-hydroxyphenyl, p-methoxyphenyl or p-phenoxyphenyl.

A halogen atom is bromine, iodine or fluorine, or, in particular, chlorine, and the number m is preferably 0 or 1. X is preferably —NH$_2$, and the number n is, in particular, 1.

The thermoplastics according to the invention preferably contain those derivatives of the formula I in which n and p are 1 and m is the number 0.

Thermoplastics containing compounds of the formula I in which X is —NH$_2$, Y is —CO—, R is —H, —NH$_2$, C$_1$-C$_{18}$-alkyl, phenyl, or C$_2$-C$_3$-alkyl which is substituted by —OH and/or C$_1$-C$_4$-alkoxy or phenoxy, m is the number 0 and n and p are the number 1, are also preferred.

The thermoplastics according to the invention very particularly preferred contain compounds of the formula I in which X is —NH$_2$, LY is —CO—, R is —H, —NH$_2$, C$_1$-C$_4$-alkyl, phenyl or —C$_2$H$_4$OH, m is the number 0 and n and p are the number 1.

Examples which may be mentioned of compounds of the formula I are: anthranilic acid hydroxylamide, 5-chloroanthranilic acid hydroxylamide, anthranilic acid amide, 3-aminobenzoic acid amide, 4-aminobenzoic acid amide, anthranilic acid N-methylamide, anthranilic acid N-ethylamide, anthranilic acid N-(1',1'-dihydroxymethyl-2'-hydroxyethyl)-amide, anthranilic acid N-n-propylamide, anthranilic acid N-isopropylamide, anthranilic acid N-n-butylamide, anthranilic acid N-n-hexylamide, anthranilic acid N-n-octylamide, anthranilic acid N-(2'-ethylhexyl)-amide, anthranilic acid N-(1'-ethylhexyl)-amide, anthranilic acid N-n-decylamide, anthranilic acid N-n-dodecylamide, anthranilic acid N-n-tetradecylamide, anthranilic acid N-n-hexadecylamide, anthranilic acid N-n-octadecylamide, anthranilic acid N-phenylamide, anthranilic acid N-benzylamide, anthranilic acid N-(2',3'-dihydroxypropyl)-amide, anthranilic acid N-(2'-hydroxyethyl)-amide, 5-chloroanthranilic acid N-(2'-hydroxyethyl)-amide, anthranilic acid N-(2'-hydroxy-n-propyl)-amide, anthranilic acid N-(3'-hydroxy-n-propyl)-amide, anthranilic acid N-(2'-hydroxy-2'-phenylethyl)-amide, anthranilic acid N-(p-hydroxyphenyl)-amide, anthranilic acid N-(p-phenoxyphenyl)-amide, anthranilic acid N-(2'-hydroxy-3'-n-butoxy-n-propyl)-amide, 3-aminobenzoic acid N-(2'-hydroxyethyl)-amide, 4-aminobenzoic acid N-(2'-hydroxyethyl)-amide, 2-N-methylamino-benzoic acid N-(2'-hydroxyethyl)-amide, 4-methoxybenzoic acid amide, 4-ethoxybenzoic acid amide, 2-aminobenzoic acid hydrazide, 3-aminobenzoic acid hydrazide, 4-aminobenzoic acid hydrazide, 2-, 3- or 4-methoxybenzoic acid hydrazide, 2,4-dimethoxybenzoic acid hydrazide, 3,4-diaminobenzoic acid hydrazide, 3,4-dimethoxybenzoic acid hydrazide, 3,4,5-trimethoxybenzoic acid hydrazide, 2-amino-5-chlorobenzoic acid hydrazide, 2-amino-3,5-dichlorobenzoic acid hydrazide, 2-methoxy-4-aminobenzoic acid hydrazide, anthranilic acid N-[2'-(o-aminobenzoyloxy)-ethyl]-amide, anthranilic acid N-[2'-(p-aminobenzoyloxy)-ethyl]-amide, 3-aminobenzoic acid N-(2'-hydroxyethyl)-amide, 4-aminobenzoic acid N-(2'-hydroxyethyl)-amide, 4-chloroanthranilic acid N-(2'-hydroxyethyl)-amide, 3,5-dichloroanthranilic acid N-(2-hydroxyethyl)-amide, 4-chloroanthranilic acid hydrazide, 3,5-dichloroanthranilic acid hydrazide, 5-chloroanthranilic acid hydrazide, 4-amino-3-methoxybenzoic acid N-(2'-hydroxyethyl)-amide and 4-amino-3-methoxybenzoic acid hydrazide.

Many of the compounds of the formula I are known and can be prepared by processes which are known per se.

Compounds of the formula I can be prepared, for example, by reacting an isatoic anhydride derivative with an amine of the formula III

H₂NR (III)

or with hydrazine, for example by the process described in Synthesis 1980, pages 516–523, or that described in U.S. Pat. No. 3,351,659, or by reacting a benzenecarboxylic acid ester with an amine of the formula III or with hydrazine to give compounds of the formula I.

Such compounds can also be prepared by reacting a nitrobenzenecarboxylic acid chloride with an amine of the formula III and then reducing the nitro group to the amine.

In the formula III, the radical R is as defined above.

The invention furthermore relates to a process for the preparation of compounds of the formula IV

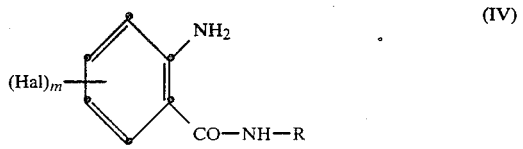

in which R, Hal and m are as already defined above, but R is preferably —CH₂—CH₂—OH, by reacting a suitably substituted isatoic anhydride with a primary amine RNH₂, which comprises using butyl acetate or a butyl acetate/water mixture or the reaction product as the reaction medium.

The compounds of the formula I may be added to chlorine-containing thermoplastics in the customary amounts. Preferably, 0.01 to 10% by weight, in particular 0.05 to 5 and especially 0.2 to 2.5% by weight, based on the chlorine-containing thermoplastics, are incorporated. Mixtures of the compounds of the formula I can also be used.

Vinyl chloride polymers or copolymers are preferably used as the chlorine-containing thermoplastics. Suspension polymers and bulk polymers, and emulsion polymers which have been washed out, i.e. have a low emulsifier content, are preferred. Examples of suitable comonomers for the copolymers are: vinyl acetate, vinylidene chloride, trans-di-chloroethylene, ethylene, propylene, butylene, maleic acid, acrylic acid, fumaric acid and itaconic acid. Other suitable chlorine-containing thermoplastics are post-chlorinated PVC and chlorinated polyolefins, and furthermore graft polymers of PVC with EVA (ethylene/vinyl acetate) and MBS (methyl acrylate/butadiene/styrene).

The thermoplastics stabilised according to the invention are prepared by known processes. The stabilisers of the formula I are incorporated into the chlorine-containing thermoplastics to be stabilised before these thermoplastics are processed in conventional devices. A homogeneous mixture can be achieved, for example, with the aid of a two-roll mixer at 150° to 210°.

The compounds of the formula I according to the invention can also advantageously be used in combination with the usual amounts of at least one of the conventional PVC stabilisers and/or other additives, such as epoxy compounds, preferably epoxidised fatty acid esters, such as epoxidised soya bean oil, phosphites, metal carboxylates and metal phenolates of metals of the second main group and sub-group of the Periodic Table, or inorganic salts of metals of the second subgroup of the Periodic Table, for example ZnCl₂, or furthermore organo-tin compounds, in particular mono- or di-organo-tin compounds, and antimony-trimercaptocarboxylic acid esters, and antioxidants.

Co-stabilisers are preferably incorporated in amounts of 0.05 to 3% by weight, in particular 0.1 to 3% by weight, based on the total composition.

Suitable conventional phosphites are phosphites of the general formulae V and VI

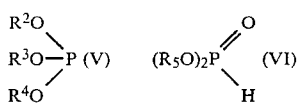

in which R², R³ and R⁴ are identical or different and are C₆–C₁₈-alkyl, a phenyl radical which is unsubstituted or substituted by C₁–C₉-alkyl or C₁–C₉-alkoxy, or C₅–C₇-cycloalkyl, and in which R₅ is C₆–C₁₈-alkyl.

A C₆–C₁₈-alkyl radical R², R³, R⁴ or R⁵ is, for example, n-hexyl, n-octyl, n-nonyl, decyl, dodecyl, tetradecyl, hexadecyl or octadecyl. Alkyl groups with 8 to 12 C atoms are preferred.

A substituted phenyl radical R², R³ or R⁴ is, for example, tolyl, ethylphenyl, xylyl, nonyl, cymyl, cresyl, 4-methoxyphenyl, 2,4-dimethoxyphenyl, ethoxyphenyl, butoxyphenyl, p-n-octylphenyl or p-n-nonylphenyl.

Very particularly suitable phosphites are trioctyl, tridecyl, tridodecyl, tritetradecyl, tristearyl, trioleyl, triphenyl, tricresyl, tris-p-nonylphenyl or tricyclohexyl phosphite, and the aryl dialkyl and alkyl diaryl phosphites are particularly preferred, for example phenyl-didecyl, nonylphenyl didedyl, 2,4-di-tert.-butylphenyl di-dodecyl and 2,6-di-tert.-butylphenyl didodecyl phosphite.

Examples of metal carboxylates are the metal salts of saturated, unsaturated or hydroxyl-substituted aliphatic carboxylic acids with 6 to 20 C atoms, such as hexanoic acid, heptanoic acid, octanoic acid, 2-ethylhexanoic acid, undecylic acid, lauric acid, myristic acid, palmitic acid, stearic acid, 12-hydroxystearic acid, oleic acid, linoleic acid or ricinoleic acid. The metal salts of aromatic carboxylic acids, for example benzoates substituted by $C_1$–$C_8$-alkyl, are also of interest. Metals from the series comprising Ba, Sr, Ca, Mg and Zn are preferred. Examples of preferred metal carboxylates are Ca, Ba or Zn stearate or oleate.

Particularly suitable metal phenolates are the metal salts of phenols with 6–20 C atoms, for example alkylphenols, such as p-tert.-butyl-, p-octyl-, p-nonyl- or p-dodecylphenol.

Examples of organo-tin compounds are (polymeric) organo-tin oxides or sulfides, such as butyl-stannous or -thiostannous acid, organo-tin carboxylates, such as dibutyl-tin dilaurate, organo-tin alcoholates and phenolates, organo-tin mercaptides, such as dibutyl-tin didodecylmercaptide, or organo-tin mercaptocarboxylic acid esters, such as di-n-octyl-tin di-(2-ethylhexyl-thioglycolate) or di-n-butyl-tin di-(n-dodecyl mercaptopropionate). Of these, mono- and di-organo-tin thioglycolates and mixtures thereof are particularly suitable.

Examples of antioxidants are alkylated monophenols and hydroquinones, hydroxylated thiodiphenyl ethers, 1,4-alkylidene-bisphenols, benzyl compounds, acylaminophenols, esters or amides of β-(3,5-di-tert.-butyl-4-hydroxy-phenyl)-propionic acid and esters of β-(5-tert.-butyl-4-hydroxy-3-methylphenyl)-propionic acid.

Preferred antioxidants are alkylated monophenols, alkylidene-bisphenols and phenyl-substituted propionic acid esters, but in particular 2,6-di-tert.-butyl-p-cresol, 2,2-bis-(4'-hydroxyphenyl)-propane and n-octadecyl β-(3,5di-tert.-butyl-4-hydroxyphenyl)-propionate.

The compounds of the formula I can also be used with other nitrogen-containing organic stabilisers. Examples of these are cyanamide, dicyandiamide, guanamines, such as benzoguanamine, indoles, such as phenylindole, pyrroles (for example according to European patent application Ser. No. 22,087), pyrazoles (for example as described in British Patent Specification No. 866,936), ureas and thioureas, such as monophenylurea and diphenylthiourea, aminocrotonic acid esters, β-diketones, such as stearoylbenzoylmethane, and polyols, such as pentaerythritol. The urea compounds are preferred, and dicyandiamide is particularly preferred.

Depending on the intended use of the thermoplastics stabilised according to the invention, further additives can also be incorporated before or during the incorporation of the stabilisers, for example lubricants (preferably montan waxes or glycerol esters), fatty acid esters, paraffins, plasticisers, fillers, carbon black, asbestos, kaolin, talc, glass fibres, modifiers (for example high-impact additives), fluorescent brighteners, pigments, light stabilisers, UV absorbers, flameproofing agents or antistatics.

The thermoplastics according to the invention can be processed to shaped articles by the conventional shaping processes for these materials, for example by extrusion, injection-moulding or calendering. It is also possible to use plastisols.

Heat-stabilising with the stabilisers considered according to the invention is very good in the thermoplastics considered according to the invention.

The examples which follow serve to illustrate the invention in more detail. Unless defined otherwise, parts and percentages are by weight.

EXAMPLE 1

48 parts of NaOH are introduced into 300 parts of water. 41.6 parts of $NH_2OH.HCl$ are added in portions, with cooling, followed by 45.2 parts of methyl anthranilate. After the mixture has been left to stand at room temperature for 3 days, the solution is concentrated and concentrated hydrochloric acid is added to the residue thus obtained until the pH is 6. After the mixture has been filtered and the filtrate has been washed with ethanol, anthranilic acid hydroxylamide is obtained as colourless crystals of melting point 140°–142° C. with a yield of 85%.

EXAMPLE 2

24.5 parts of isatoic anhydride, 16.4 parts of m-aminophenol, 1 part of 50% strength KOH solution and 200 parts of ethanol are refluxed for 6 hours until the evolution of $CO_2$ has ended. The resulting clear solution is concentrated, the residue is recrystallised from isopropanol and the product is worked up in the customary manner. Anthranilic acid 3'-hydroxyphenylamide is obtained as colourless crystals of melting point 90°–91° C.

EXAMPLE 3

165.2 parts of ethyl p-aminobenzoate are dissolved in 150 parts of ethanolamine and ethanol is then distilled off at 160° C. The volatile constituents are subsequently stripped off in vacuo and the resulting residue is recrystallised from isopropanol. p-Aminobenzoic acid β-hydroxyethylamide of melting point 116° C. is obtained.

EXAMPLE 4

(a) 80.8 parts of isatoic anhydride are introduced into 125 parts of dimethylacetamide, and a solution of 134.7 parts of stearylamine in 50 parts of dimethylformamide is added dropwise. When the evolution of $CO_2$ has ended (3 hours) the resulting clear solution is stirred into 2 liters of $H_2O$ and the resulting precipitate is recrystallised from ethanol, using active charcoal. Anthranilic acid stearylamide of melting point 89°–90° C. is obtained.

(b) Anthranilic acid n-dodecylamide of melting point 73°–75° C. is obtained by a process analogous to that described in Example 4(a) from isatoic anhydride and n-dodecylamine.

EXAMPLE 5

(a) 1,039 parts of isatoic anhydride (96% pure) are introduced in portions into a solution of 410.5 parts of ethanolamine and 2,000 parts of $H_2O$ at room temperature and, after the evolution of $CO_2$ has ended, stirring is continued at 60° C. for ½ hour. The resulting brown solution is concentrated to a residue, and this is taken up in $CHCl_3$, adhering water is removed azeotropically and the mixture is again concentrated to a residue, anthranilic acid β-hydroxyethylamide of melting point 90°–92° C. being obtained. $^1$H-NMR (in DMSO; ppm against TMS): 6.5, 6.7, 7.1 and 7.5 (4H); 3.3 and 3.5 (4H, 2>CH$_2$); 4.7 (1H, —OH); and 6.4 (2H, —NH$_2$) and 8.1 (1H, —NH—).

(b) 85.6 parts of isatoic anhydride are suspended in 300 parts of butyl acetate and 12 parts of water. 30.6 parts of ethanolamine are added dropwise at 40° to 50° C., with stirring (evolution of CO$_2$), and the mixture is allowed to after-react at 100° C. for 30 minutes. After the organic phase has been separated off and the volatile constituents have been removed, 69.7 parts of the end product are obtained. Further dilution of the aqueous phase with 10 parts of water and cooling to 0° C. gives, after filtration and drying, a further 9.0 parts, so that the total yield of end product is 88% of theory.

(c) 85.6 parts of isatoic anhydride are suspended in 250 ml of butyl acetate at 40° C. A mixture of 30.5 parts of ethanolamine and 50 parts of butyl acetate is added dropwise, with stirring. The mixture is kept under reflux for one hour, for the after-reaction. After addition of 10 parts of a filter aid, the mixture is filtered with suction and the residue is rinsed with 40 parts of hot butyl acetate. The filtrate is cooled to 0° C. and the reaction product is separated off by filtration and dried. The filtrates are used in four further cycles, the procedure being as described above. The end yield is 82% of theory.

(d) 32.6 parts of isatoic anhydride are introduced in portions into a melt of 56.0 parts of anthranilic acid N-(2'-hydroxyethyl)-amide and 12.2 parts of ethanolamine at 110° C. The mixture is kept at 115° C. for one hour. After addition of 250 parts of butyl acetate and 10 parts of a filter aid, the mixture is stirred at 100° C. for one hour. After filtration and removal of the volatile constituents, the reaction product remains in a yield of 96% of theory.

(e) Further compounds of the formula I, which are listed in the following Table I, are prepared by a process analogous to that given in the abovementioned Example 5(a).

TABLE 1

| Example No. | Structure of the compounds of the formula I | Melting point (°C.) | $^1$H—NMR (recorded in DMSO), in ppm against TMS |
|---|---|---|---|
| 6 | 2-NH$_2$-C$_6$H$_4$-CONHCH$_2$CH(OH)—CH$_3$ | 105–107 | 1.1 (3H, —CH$_3$); 3.2 (2H, \>CH$_2$); 3.8 (1H, \>CH); 4.7 (1H, —OH); 6.5, 6.7, 7.1, 7.5 (4H); 6.3 (2H, —NH$_2$) and 8.1 (1H, —NH—) |
| 7 | 2-NH$_2$-C$_6$H$_4$-CONHCH$_2$CH$_2$CH$_2$OH | 58–60 | 2.7, 3.3, 3.5 (6H, 3 \>CH$_2$); 4.5 (1H, —OH); 6.4 (2H, —NH$_2$); 6.5, 6.7, 7.1, 7.5 (4H); 8.2 (1H, —NH) |
| 8 | 2-NH$_2$-C$_6$H$_4$-CONHCH$_2$CH(OH)—C$_6$H$_5$ | 116–118 | 3.3–3.5 (2H, \>CH$_2$); 5.5 (1H, —OH); 5.8 (1H, \>CH); 6.4 (2H, —NH$_2$); 8.1 (1H, \>NH); 6,5–7,5 (9H) |
| 9 | 2-NH$_2$-C$_6$H$_4$-CONHCH$_2$CH(OH)—CH$_2$O(CH$_2$)$_3$—CH$_3$ | 70–71 | 0.8 (3H, —CH$_3$); 1.5, 2.3, 3.2, 3.4 (10 H, 5 \>CH$_2$); 3.8 (1H, \>CH); 4.9 (1H, —OH); 6.4 (2H, —NH$_2$); 8.1 (1H, \>NH); 6.5, 6.7, 7.1, 7.5 (4H) |

TABLE 1-continued

| Example No. | Structure of the compounds of the formula I | Melting point (°C.) | $^1H$—NMR (recorded in DMSO), in ppm against TMS |
|---|---|---|---|
| 10 | Cl–C$_6$H$_3$(NH$_2$)–CONHCH$_2$CH$_2$OH | 120–122 | 3.3, 3.5 (4H, 2 CH$_2$); 4.7 (1H, OH); 6.5 (2H, —NH$_2$); 6.7, 7.2, 7.6 (3H); 8.3 (1H, NH) |

USE EXAMPLES

EXAMPLE 11

A dry mixture having the composition given in the recipe below is milled on a roll mill at 180° C. for 5 minutes. Pieces of test sheet 0.3 mm thick are taken from the rough sheet formed. The samples of sheet are exposed to heat at 180° C. in an oven and the Yellowness Index (YI) is determined in accordance with ASTM D 1925-70 on samples at intervals of 10 minutes. The results are summarised in Table II which follows.

| Recipe: | | |
|---|---|---|
| Solvic ® 264 GA (K value 64) | 100.0 | g |
| Ca stearate | 0.35 | g |
| Zn stearate | 0.15 | g |
| Rheoplast ® 39 (epoxidised soya bean oil) | 3.0 | g |
| Irgastab ® CH 300 (didecylphenyl phosphite) | 0.55 | g |
| Compound of the formula I | 2.5 | mmol |

TABLE II

| Stabiliser of the formula I according to Example No.: | Yellowness Index (YI in accordance with ASTM D 1925-70) after intervals of time of (minutes) | | | |
|---|---|---|---|---|
| | 0 | 10 | 20 | 30 minutes |
| 1 | 4.8 | 4.5 | 8.2 | 18.8 |
| 2 | 5.0 | 7.9 | 11.1 | 24.2 |
| 5 | 4.7 | 6.4 | 10.4 | 24.6 |
| 6 | 2.4 | 3.3 | 6.6 | 11.0 |
| 7 | 2.5 | 4.4 | 8.0 | 15.2 |
| 8 | 5.2 | 7.0 | 9.4 | 16.7 |
| 9 | 6.5 | 10.2 | 12.8 | 21.1 |
| 10 | 2.9 | 3.8 | 4.8 | 6.0 |
| none | 16.6 | 32.6 | 34.7 | 31.8 |

These test results clearly show the improvement in the basic recipe (without a stabiliser) by addition of the stabilisers of the formula I considered according to the invention, in particular in view of the initial colour.

EXAMPLE 12

100 parts of E-PVC (Vestolit ®E 6507), 2.0 parts of Loxiol ®GS 1 and 3 parts of titanium dioxide RN 57 ® (Titangesellschaft) are mixed with 0.3 part of anthranilic acid ethanolamine (Example No. 5a), the mixture is subjected to a static heat test in accordance with Use Example 11 and the degree of yellowing is determined on a sample at intervals of 5 minutes by means of the Yellowness Index (YI) in accordance with ASTM D 1925-70. The results are shown in Table III.

TABLE III

| Exposure time (in minutes) and yellowing (YI in accordance with ASTM D 1925-70) | | | | | | | | | |
|---|---|---|---|---|---|---|---|---|---|
| 0' | 5' | 10' | 15' | 20' | 25' | 30' | 35' | 40' | 45' |
| 8.5 | 12.2 | 15.7 | 23.9 | 30.7 | 37.6 | 44.4 | 59.1 | 64.4 | 69.6 |

EXAMPLE 13

100 parts of Vestolit ®E 6507 are plasticised with 40 parts of di-2-ethylhexyl phthalate, pigmented with 3 parts of titanium dioxide and stabilised with 0.4 part of the compound of the formula I used in Example 12. The following Table IV contains the results of a static heat test carried out according to Example 12 at 180° C.

TABLE IV

| Exposure time (in minutes) and yellowing (YI in accordance with ASTM D 1925-70) | | | | | | | | | |
|---|---|---|---|---|---|---|---|---|---|
| 0' | 5' | 10' | 15' | 20' | 25' | 30' | 40' | 45' | 50' |
| 5.1 | 6.6 | 8.7 | 11.4 | 15.7 | 20.5 | 25.4 | 31.3 | 37.8 | 42.2 |

EXAMPLE 14

100 parts of Vestolit ®E 6507, 3.5 parts of Loxiol ®GS 1 and a combination, according to the invention, of 0.5 part of an organo-tin stabiliser (dibutyl-tin bis-isooctylthioglycolate), 0.5 part of anthranilic acid ethanolamine (Example 5a), 2.0 parts of epoxidised soya bean oil and 0.5 part of monophenyl didecyl phosphite are subjected to a prolonged milling test on a laboratory roll mill at 190° C., pieces of sheet (0.3 mm thick) being taken at intervals of 5 minutes and the degree of yellowing of these samples being determined by means of the Yellowness Index (YI) in accordance with ASTM D 1925-70. The results are shown in Table V.

TABLE V

| Exposure time (in minutes) and yellowing (YI in accordance with ASTM D 1925-70) | | | | |
|---|---|---|---|---|
| 5' | 10' | 15' | 20' | 25' |
| 8.3 | 26.5 | 57.4 | 85.2 | 104 |

EXAMPLE 15

Other compounds of the formula I considered according to the invention are tested in the following recipes by the process described in Example 11 at 190°

C. (oven temperature). The results are shown in Table VI below.

Recipes

A Vestolit®E 6507 (100 parts); Loxiol®GS 1 (2 parts); TiO$_2$ (4 parts); stabiliser of the formula I (0.8 part).

A$_1$ Vestolit®6507 (100 parts); Loxiol®GS 1 (2 parts); TiO$_2$ (4 parts); stabiliser of the formula I (0.6 part).

B Vestolit®E 8019 (100 parts); Wachs®E (Hoechst, 0.4 part); stabiliser of the formula I (0.6 part).

C Hostalit®E 2078 (100 parts); Wachs®OP (0.4 part); Rheoplast®39 (2 parts); stabiliser of the formula I (0.8 part).

TABLE VI

| No. | Stabiliser of the formula I | Recipe | YI (in accordance with ASTM D 1925-70) and exposure times in minutes | | | | | |
|-----|------|------|-----|-----|-----|-----|-----|-----|
| | | | 0' | 5' | 10' | 15' | 20' | 25' |
| 16 | 2-NH$_2$, 1-CONH$_2$ benzene | A$_1$ | 18 | 36 | 59 | 73 | | |
| | | B | 30 | 40 | 66 | 91 | | |
| 17 | 4-H$_2$N, 1-CONH$_2$ benzene | A$_1$ | 12 | 25 | 39 | 46 | 54 | |
| | | B | 23 | 31 | 39 | 58 | 93 | |
| | | C | 17 | 26 | 33 | 44 | 66 | 83 |
| 18 | 2-NH$_2$, 1-CONH—n-C$_4$H$_9$ benzene | A | 18 | 28 | 42 | 57 | 66 | 72 |
| | | C | 22 | 37 | 55 | 75 | 94 | 121 |
| 19 | 2-NH$_2$, 1-CONH—C$_6$H$_5$ benzene | A | 20 | 39 | 42 | 55 | 58 | 66 |
| | | C | 25 | 43 | 59 | 78 | 99 | 124 |
| 20 | 2-NH$_2$, 1-CONH—n-C$_{18}$H$_{37}$ benzene | A$_1$ | 30 | 27 | | | | |
| | | B | 57 | 68 | 84 | 99 | | |
| 21 | 2-NH$_2$, 1-CONHCH$_2$CH$_2$OH benzene | A | 10 | 15 | 22 | 28 | 41 | 55 |
| | | A$_1$ | 12 | 22 | 34 | 38 | 50 | |
| | | B | 17 | 25 | 34 | 51 | 73 | |
| | | C | 13 | 21 | 28 | 37 | 52 | 79 |
| 22 | 3-H$_2$N, 1-CONHCH$_2$CH$_2$OH benzene | A | 15 | 20 | 28 | 39 | 42 | |
| | | C | 25 | 33 | 44 | 58 | 101 | 143 |
| 23 | 2-NH$_2$, 4-Cl, 1-CONHCH$_2$CH$_2$OH benzene | A$_1$ | 13 | 25 | 38 | 45 | 50 | |

TABLE VI-continued

| No. | Stabiliser of the formula I | Recipe | YI (in accordance with ASTM D 1925-70) and exposure times in minutes | | | | | |
|---|---|---|---|---|---|---|---|---|
| | | | 0' | 5' | 10' | 15' | 20' | 25' |
| 24 | 2-NHCH$_3$, 1-CONHCH$_2$CH$_2$OH benzene | A$_1$<br>B | 22<br>45 | 33<br>57 | <br>72 | <br>93 | | |
| 25 | 2-NH$_2$, 1-CONHCH$_2$CH$_2$CH$_2$—OH benzene | A$_1$<br>B | 14<br>24 | 26<br>34 | 40<br>46 | 45<br>63 | 55<br>85 | |
| 26 | 2-NH$_2$, 1-CONHCH$_2$CH(OH)CH$_3$ benzene | A$_1$<br>B | 15<br>27 | 44<br>33 | 46<br>48 | 49<br>68 | 60<br>91 | |
| 27 | 2-NH$_2$, 1-CONHCH$_2$CH(OH)CH$_2$O—nC$_4$H$_9$ benzene | A$_1$<br>B | 18<br>44 | 32<br>51 | 46<br>67 | 54<br>87 | 62<br>116 | |
| 28 | 2-NH$_2$, 1-CONHNH$_2$ benzene | A<br>C | 8<br>13 | 12<br>20 | 18<br>27 | 30<br>32 | 38<br>51 | 49<br>63 |
| 29 | H$_2$N—C$_6$H$_4$—CONHNH$_2$ | A<br>C | 12<br>17 | 14<br>26 | 20<br>33 | 28<br>44 | 34<br>66 | <br>83 |
| 30 | 2-NH$_2$-C$_6$H$_4$-CONHCH$_2$CH$_2$OOC-C$_6$H$_4$-NH$_2$ | A<br>C | 17<br>18 | 21<br>31 | 30<br>43 | 44<br>55 | 47<br>68 | 58<br>108 |
| 31 | [2-NH$_2$-C$_6$H$_4$-CO—NH—(CH$_2$)$_3$—]$_2$ | A$_1$<br>B | 24<br>41 | 35<br>50 | 49<br>71 | 59<br>103 | 62<br> | |

EXAMPLE 32

Further compounds of the formula I considered according to the invention are tested in the following recipe (milling time 10 minutes at 180° C.) according to Example 11 at 200° C. (oven temperature).

Recipe

Vestolit ®E 8019 (100 parts); Wachs ®E (Hoechst, 4 parts); stabiliser of the formula I (0.6 part). The results are shown in Table VII below.

TABLE VII

| No. | Stabiliser of the formula I | 0' | 5' | 15' |
|---|---|---|---|---|
| 33 | 2-NH₂, 1-CONHC(CH₂OH)₃ benzene | 26.8 | 76.7 | 140.6 |
| 34 | 2-NH₂, 5-NH₂ (H₂N), 1-CONHNH₂ benzene | 56.8 | 74.5 | 98.1 |
| 35 | 1-NH—NH₂, 4-CO—NH—NH₂ benzene | 62.5 | 87.5 | 138.8 |
| 36 | 2-H₃CO, 1-CONHNH₂ benzene | 46.1 | 78.1 | 100.5 |
| 37 | 2-OCH₃, 1-CONHNH₂ benzene | 44.4 | 97.3 | 127.4 |
| 38 | 3-OCH₃, 1-CONHNH₂ benzene | 41.5 | 67.9 | 90.4 |
| 39 | 2-H₃CO, 6-OCH₃, 1-CONHNH₂ benzene | 42.8 | 87.3 | 114.6 |
| 40 | 2-H₃CO, 3-OCH₃, 1-CONHNH₂ benzene | 42.4 | 66.5 | 80.1 |
| 41 | 2-CH₃, 3-OCH₃, 1-CO—NH—NH₂ benzene | 40.7 | 100.2 | 133.6 |
| 42 | 2-H₃CO, 3-OCH₃, 6-OCH₃, 1-CONHNH₂ benzene | 47.6 | 67.1 | 83.9 |

Yellowness Index in accordance with ASTM D 1925-70 and exposure times in minutes

EXAMPLE 43

100 parts of E-PVC prestabilised under alkaline conditions (Vestolit®E 6507), 40 parts of dioctadecyl phthalate (DOP), 3 parts of titanium dioxide (Kronos®RN 57 p) and 0.4 part of a stabiliser mixture consisting of 70 parts by weight of dicyandiamide and 30 parts by weight of anthranilic acid ethanolamide (Example No. 5a) are mixed and the mixture is subjected to a static heat test according to Use Example 11 at 180° C. The degree of yellowing of a sample is determined at intervals of 5 minutes by measurement of the Yellowness Index (YI) in accordance with ASTM D 1925-70. The results are shown in Table VIII.

TABLE VIII

Exposure time (in minutes) and yellowing (YI in accordance with ASTM D 1925-70)

| 0' | 5' | 10' | 15' | 20' | 25' | 30' | 35' | 40' | 45' | 50' |
|---|---|---|---|---|---|---|---|---|---|---|
| 13.1 | 15.1 | 17.9 | 23.2 | 28.8 | 33.1 | 40.0 | 44.3 | 49.4 | 56 | 62 |

EXAMPLE 44

100 parts of PVC (Hostalit®E 2078), 4 parts of Wachs E and 0.6 part of a stabiliser mixture consisting of 70 parts by weight of anthranilic acid ethanolamide (Example No. 5a) and 30 parts by weight of dicyandiamide are mixed and the mixture is subjected to a static heat test according to Example 11 at 200° C. The degree of yellowing of the sample is determined at intervals of 5 minutes by measuring the Yellowness Index (YI) in accordance with ASTM D 1925-70. The results are shown in Table IX.

TABLE IX

Exposure time (in minutes) and yellowing (YI in accordance with ASTM D 1925-70)

| 0' | 5' | 10' | 15' |
|---|---|---|---|
| 19.1 | 45.4 | 93.4 | 138 |

What is claimed is:

1. A stabilized composition which comprises
   (a) a chlorine-containing thermoplastic derived from an ethylenically unsaturated monomer, and
   (b) 0.01 to 10% by weight, based on component (a) of at least one compound of the formula

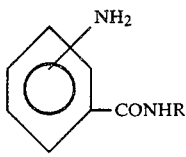

wherein

R is —OH, —NH₂ or C₂-C₃-alkyl substituted by hydroxy or said hydroxy-substituted alkyl further substituted by C₁-C₄-alkoxy or by phenoxy.

2. A composition according to claim 1 where in the compound of component (b) R is —NH₂ or —C₂H₄OH.

3. A chlorine-containing thermoplastic according to claim 1, which is an emulsion polyvinyl chloride.

4. A chlorine-containing thermoplastic according to claim 1, which also contains a urea compound.

5. A chlorine-containing thermoplastic according to claim 1, which also contains dicyandiamide.

6. A chlorine-containing thermoplastic according to claim 5, which contains a stabiliser mixture of 30 parts by weight of anthranilic acid ethanolamide and 70 parts by weight of dicyandiamide.

7. A chlorine-containing thermoplastic according to claim 5, which contains a stabiliser mixture of 70 parts by weight of anthranilic acid ethanolamide and 30 parts by weight of dicyandiamide.

* * * * *